United States Patent
Hazebrouck et al.

(10) Patent No.: US 6,268,588 B1
(45) Date of Patent: Jul. 31, 2001

(54) STEERING WHEEL HEATER ASSEMBLY AND A METHOD FOR HEATING A STEERING WHEEL

(75) Inventors: Laura Viviana Hazebrouck, Birmingham; Peter Langer, Lexington; Susan Lynn Foust, Rockwood, all of MI (US)

(73) Assignee: Ford Global Tech., Inc., Dearborn, MI (US)

(*) Notice: Subject to any disclaimer, the term of this patent is extended or adjusted under 35 U.S.C. 154(b) by 0 days.

(21) Appl. No.: 09/686,706

(22) Filed: Oct. 11, 2000

(51) Int. Cl.[7] ........................................... B60L 1/02
(52) U.S. Cl. ......................... 219/204; 219/519; 439/15
(58) Field of Search .................................. 219/202, 204, 219/528, 529, 543, 544, 545, 549, 519; 320/119; 439/15; 307/10.1; 324/660; 280/735; 74/552, 557, 558

(56) References Cited

U.S. PATENT DOCUMENTS

| | | | | |
|---|---|---|---|---|
| 1,062,745 | * | 5/1913 | Smith | 219/204 |
| 1,168,146 | * | 1/1916 | Barnes | 219/204 |
| 1,957,018 | * | 5/1934 | Martel | 219/204 |
| 2,537,606 | * | 1/1951 | Steppan | 219/204 |
| 2,609,479 | * | 9/1952 | Loewe | 219/204 |
| 2,652,476 | * | 9/1953 | Langiano | 219/204 |
| 2,662,961 | * | 12/1953 | Sargent | 219/204 |
| 4,631,976 | | 12/1986 | Noda et al. | |
| 4,884,018 | | 11/1989 | Meuret et al. | |
| 4,973,859 | * | 11/1990 | Shodai | 307/10.1 |
| 5,245,267 | * | 9/1993 | Pierret et al. | 320/119 |
| 5,294,775 | | 3/1994 | Carrier | |
| 5,773,776 | * | 6/1998 | Uleski et al. | 439/15 |
| 5,856,710 | * | 1/1999 | Baughman et al. | 307/10.1 |
| 5,934,704 | * | 8/1999 | Hansen et al. | 280/735 |
| 6,012,736 | * | 1/2000 | Hansen et al. | 280/735 |
| 6,093,908 | * | 7/2000 | Haag | 219/204 |
| 6,114,668 | * | 9/2000 | Ogata et al. | 219/204 |
| 6,118,283 | * | 9/2000 | Cripe | 324/660 |

* cited by examiner

Primary Examiner—Teresa Walberg
Assistant Examiner—Fadi H. Dahbour
(74) Attorney, Agent, or Firm—Ford Global Tech.

(57) ABSTRACT

A steering wheel heating assembly 10 which electively provides a relatively high voltage electrical signal to a heating element 16 which is coupled to a steering wheel, effective to heat the steering wheel. The assembly 10 includes a temperature sensor 28 which senses or monitors the temperature of the steering wheel and which communicates the monitored sensor to a controller 26. Should the temperature of the steering wheel be above a certain value, the controller 26 prevents the relatively high voltage signal from being communicated to the heating element 16. The controller 26 may also monitor the operating speed of the engine and prevent such signal communication when the engine is not being operated. The relatively high voltage signal allows a conventional clockspring wiring assembly 12 to be utilized since the power can be transferred at a lower current than would be required at a lower voltage, thereby obviating the need for a relatively costly and noisy slip ring assembly and relatively costly additional vehicular wiring.

18 Claims, 1 Drawing Sheet

STEERING WHEEL HEATER ASSEMBLY AND A METHOD FOR HEATING A STEERING WHEEL

FIELD OF THE INVENTION

The present invention generally relates to a steering wheel heater assembly and a method for heating a steering wheel and, more particularly, to an assembly which selectively heats a vehicular steering wheel by the use of a relatively small amount of electrical current and without undesirably causing noise.

BACKGROUND OF THE INVENTION

It is desirable to selectively heat a vehicular steering wheel in order to provide comfort to the driver. Present technology steering wheel heating assemblies utilize relatively large amounts of electrical currents to heat an element residing within the steering wheel. Existing clockspring assemblies cannot generally conduct this relatively large amount of electrical current. This approach thereby requires additional and relatively costly wiring within the passenger compartment. One attempt to reduce the need for such additional wiring requires the use of relatively costly and relatively noisy "slip ring" assemblies.

It is therefore desirable to selectively heat a vehicular steering wheel by the use of an existing and conventional clockspring wiring assembly and without undesirably and appreciably creating noise.

SUMMARY OF THE INVENTION

It is a first object of the present invention to provide a method and an apparatus for heating a vehicular steering wheel by the use of a conventional clockspring wiring assembly.

It is a second object of the present invention to provide a method and an apparatus for heating a vehicular steering wheel by the use of a conventional clockspring wiring assembly and without producing undesirable noise.

It is a third object of the present invention to provide a method and an apparatus for heating a vehicular steering wheel by the use of a conventional clockspring wiring assembly and by providing a relatively large amount of voltage and a relatively small amount of electrical current to a heating element which resides upon and/or within the steering wheel.

According to a first aspect of the present invention, a steering wheel heating assembly is provided. The assembly includes a heating element which is coupled to the steering wheel; and a voltage generation assembly which is coupled to the heating element and which produces and communicates a relatively large amount of voltage to the heating element, effective to selectively heat the steering wheel.

According to a second aspect of the present invention, a method for heating a steering wheel is provided. The method includes the steps of providing a heating element; coupling the heating element to the steering wheel; providing a relatively large amount of voltage; and selectively communicating the relatively large amount of voltage to the heating element.

These and other aspects, features, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
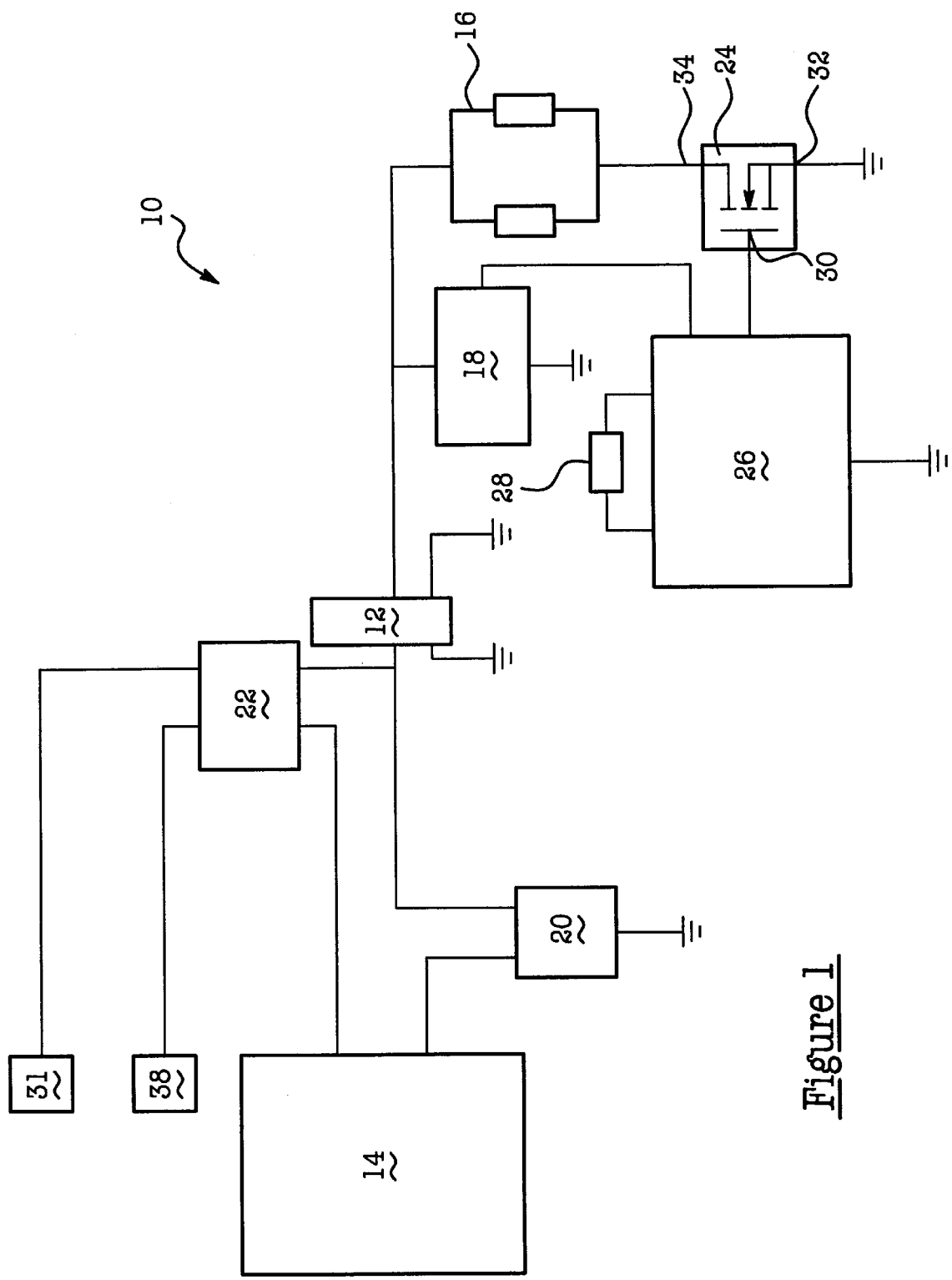
FIG. 1 is a schematic diagram of a steering wheel heating assembly which is made in accordance with the teachings of the preferred embodiment of the invention.

Referring now to FIG. 1, there is shown a steering wheel heating assembly 10 which is made in accordance with the teachings of the preferred embodiment of the invention. As shown, assembly 10 is adapted for use with a conventional clockspring wiring assembly 12 and an instrument panel or control assembly 14.

Particularly, assembly 10 includes at least one heating element 16, a direct current to direct current converter 18, a switch assembly 20, a relay 22, a second switch 24, a temperature controller 26 which may be operable under stored program control, and a temperature sensor 28.

As shown, temperature sensor 28 is physically and communicatively coupled to the controller 26 and the controller 26 is physically and communicatively coupled to the switch 24 and to the converter 18. In one non-limiting embodiment of the invention, the switch or other means of activation 24 comprises a "MOSFET" type switch and the controller 26 is coupled to the gate terminal 30 of the switch 24. Further, the source terminal 32 of the switch 24 is coupled to an electrical ground potential while the drain terminal 34 of the switch 24 is physically and communicatively coupled to the heating element 16.

The heating element 16 is physically and communicatively coupled to the converter 18 and the converter 18 and the heating element 16 are each physically and communicatively coupled to the conventional clockspring wiring assembly 12. Moreover, the clockspring wiring assembly 12 is physically and communicatively coupled to the switch 20 and relay 22 of the signal generation assembly. In one non-limiting embodiment, the signal generation assembly comprises switch 20, relay 22, instrument panel or instrument controller 14 and voltage sources 31, 38. Switch 20 is further coupled to the instrument panel or instrument controller 14. Additionally, relay 22 is physically and communicatively coupled to the instrument panel or controller 14 and to the two sources of voltage 31, 38. In one non-limiting embodiment of the invention, source 31 comprises a 42 volt source and source 38 comprises a 14 volt source, while the temperature sensor 28 and the heating element 16 are "coupled to" a steering wheel which is to be selectively and controllably heated. It should be appreciated that the foregoing term "coupled to" means that the temperature sensor 28 and the element 16 may be "embedded within" a steering wheel, integrally form a part of the steering wheel, or be selectively attached to the steering wheel. Further, it should be appreciated that assembly 10 may be used to heat nonvehicular steering wheels (e.g., boat type wheels) and may be used to heat a variety of dissimilar apparatuses (e.g., a gearshift knob).

In the operation of one non-limiting embodiment, a user depresses the switch 20, effective to generate and communicate a signal to the control assembly 14. Upon receipt of the signal, the control assembly 14 generates and communicates a signal to the relay 22, effective to cause the relay 22 to communicate about 42 volts of voltage to the clockspring wiring assembly 12. Importantly, the use of such a relatively high voltage signal (e.g., greater than 40 volts), allows only a relatively low electrical current (e.g., about 3 amps) to be used within and communicated to the clockspring wiring assembly 12, thereby obviating the need for costly and noisy slip rings and additional and relatively costly wiring. The communicated voltage is coupled to the converter 18 which converts the voltage to about 14 volts and communicates this "converted voltage" to the controller 26.

The sensor 28 senses the temperature of a steering wheel to which it is coupled and the sensed temperature is communicated to the controller 26. Particularly, controller 26 determines if the sensed temperature is below some predetermined and stored temperature threshold value. Should the sensed temperature be below this stored threshold value, controller 26 causes the gate terminal 30 of switch 24 to be biased in a manner which allows the drain terminal 34 to be coupled to the electrical ground potential which is provided at the source terminal 32. In this manner, the 42 volts of voltage and the relatively small or low electrical current signal is communicated through the converter 18 to the heating element 16, effective to heat the steering wheel. Upon a second depression of the switch 20, the relay 22 is "opened", thereby substantially preventing the voltage from being communicated to the clockspring wiring assembly 12 and to the heating element 16. Moreover, should the temperature sensor determine that the steering wheel has been sufficiently heated, the controller 26 may selectively cause the drain terminal 34 to be substantially disconnected from the source terminal 32, effective to substantially prevent further heat from being generated by the heating element 16. Moreover, in yet another non-limiting embodiment, instrument cluster 14 or controller 26 senses the speed of the engine and substantially prevents the electrical signal from being communicated to the heating element 16 when the engine is not being operated, thereby substantially preventing the vehicular battery from being inadvertently and undesirably "drained".

It is to be understood that the invention is not limited to the exact construction and method which has been delineated above, but that various changes and modifications may be made without departing from the spirit and the scope of the inventions as delineated in the following claims.

What is claimed is:

1. A steering wheel heating assembly comprising:

a heating element which is coupled to a steering wheel;

a source of electrical power which provides a relatively large voltage and a relatively low current;

a clockspring wiring assembly which is coupled to said heating element;

a relay which is coupled to said source of electrical power and to said clockspring wiring assembly; and a switching assembly which is coupled to said relay and which is effective to selectively communicate a signal to said relay, said signal causing said relay to communicate said electrical power to said heating element through said clockspring wiring assembly.

2. The steering wheel heating assembly of claim 1 wherein said voltage comprises about 42 volts.

3. The steering wheel heating assembly of claim 2 wherein said current comprises about 3 amps.

4. The steering wheel heating assembly of claim 1 wherein said switching assembly comprises a selectively depressible switch.

5. A steering wheel heating assembly for use with a clockspring wiring assembly, said steering wheel heating assembly comprising:

a source of relatively high voltage energy;

a relay which is coupled to said source of relatively high voltage energy and to said clockspring wiring assembly;

a heating element;

a selectively depressible switch which is coupled to said relay; and a controller which is coupled to said clockspring wiring assembly and to said relay and which, upon a selective depression of said switch, causes said high voltage energy to be communicated to said heating element through said clockspring wiring assembly.

6. The steering wheel heating assembly of claim 5 further comprising a temperature sensor which is coupled to said controller, which senses the temperature of a steering wheel; and which communicates the sensed temperature to said controller, effective to prevent said high voltage energy from being communicated to said heating element.

7. The steering wheel heating assembly of claim 6 wherein said high voltage energy comprises about 42 volts.

8. The steering wheel heating assembly of claim 6 wherein said controller determines the operating speed of an engine and uses said determination to selectively prevent said high voltage energy from being communicated to said heating element.

9. The steering wheel heating assembly of claim 6 wherein said controller only allows said high voltage energy from being communicated to said heating element when an engine is being operated.

10. The steering wheel heating assembly of claim 5 further comprising a temperature sensor which is coupled to said controller and which senses the temperature of a steering wheel and which communicates the sensed temperature to the controller.

11. The steering wheel heating assembly of claim 10 wherein said controller stores a certain value; compares said communicated sensed temperature to said certain value; and allows said high voltage energy to be communicated to said heating element only when said communicated sensed temperature is below said certain value.

12. The steering wheel heating assembly of claim 11 further comprising a direct current to direct current converter which is coupled to said controller and to said high voltage energy source.

13. A method for heating a steering wheel by the use of an existing clockspring wiring assembly, said method comprising the steps of:

producing a relatively high voltage energy signal;

providing a heating element;

placing said heating element within said steering wheel;

coupling said heating element to said clockspring wiring assembly; and communicating said relatively high voltage energy signal to said clockspring assembly, effective to provide said signal to said heating element.

14. The method of claim 13 wherein said high voltage energy signal comprises about 42 volts.

15. The method of claim 13 further comprising the steps of:

monitoring the temperature of said steering wheel; and preventing said high voltage energy signal from being communicated to said heating element when said monitored temperature is above a certain value.

16. The method of claim 13 further comprising the step of monitoring the speed of an engine; and preventing said high voltage energy signal from being communicated to said heating element when said monitored speed is below a certain value.

17. The method of claim 13 further comprising the steps of:

providing a switch; and causing said high voltage energy signal to be communicated to said heating element upon a selective depression of said switch.

18. The method of claim 13 further comprising the steps of:

providing a MOSFET switch; and causing said high voltage energy signal to be communicated to said heating element only when said MOSFET switch is biased in a certain manner.

* * * * *